Sept. 5, 1961 W. R. CLEVER ET AL 2,999,036
METHOD OF AND APPARATUS FOR STRIPING GLASS
Original Filed Aug. 4, 1955 10 Sheets—Sheet 1

INVENTORS
WILLIAM R CLEVER &
HARRY O. PHALIN
BY
Oscar L. Spencer
ATTORNEY

Sept. 5, 1961 W. R. CLEVER ET AL 2,999,036
METHOD OF AND APPARATUS FOR STRIPING GLASS
Original Filed Aug. 4, 1955 10 Sheets-Sheet 2

INVENTORS
WILLIAM R. CLEVER &
HARRY O. PHALIN

Oscar L. Spencer
ATTORNEY

Sept. 5, 1961    W. R. CLEVER ET AL    2,999,036
METHOD OF AND APPARATUS FOR STRIPING GLASS
Original Filed Aug. 4, 1955    10 Sheets-Sheet 3

INVENTORS
WILLIAM R. CLEVER
AND HARRY O. PHALIN
Oscar L. Spencer
ATTORNEY

Sept. 5, 1961 W. R. CLEVER ET AL 2,999,036
METHOD OF AND APPARATUS FOR STRIPING GLASS
Original Filed Aug. 4, 1955 10 Sheets-Sheet 4

INVENTORS
WILLIAM R. CLEVER and
HARRY O. PHALIN
BY
Oscar L. Spencer
ATTORNEY

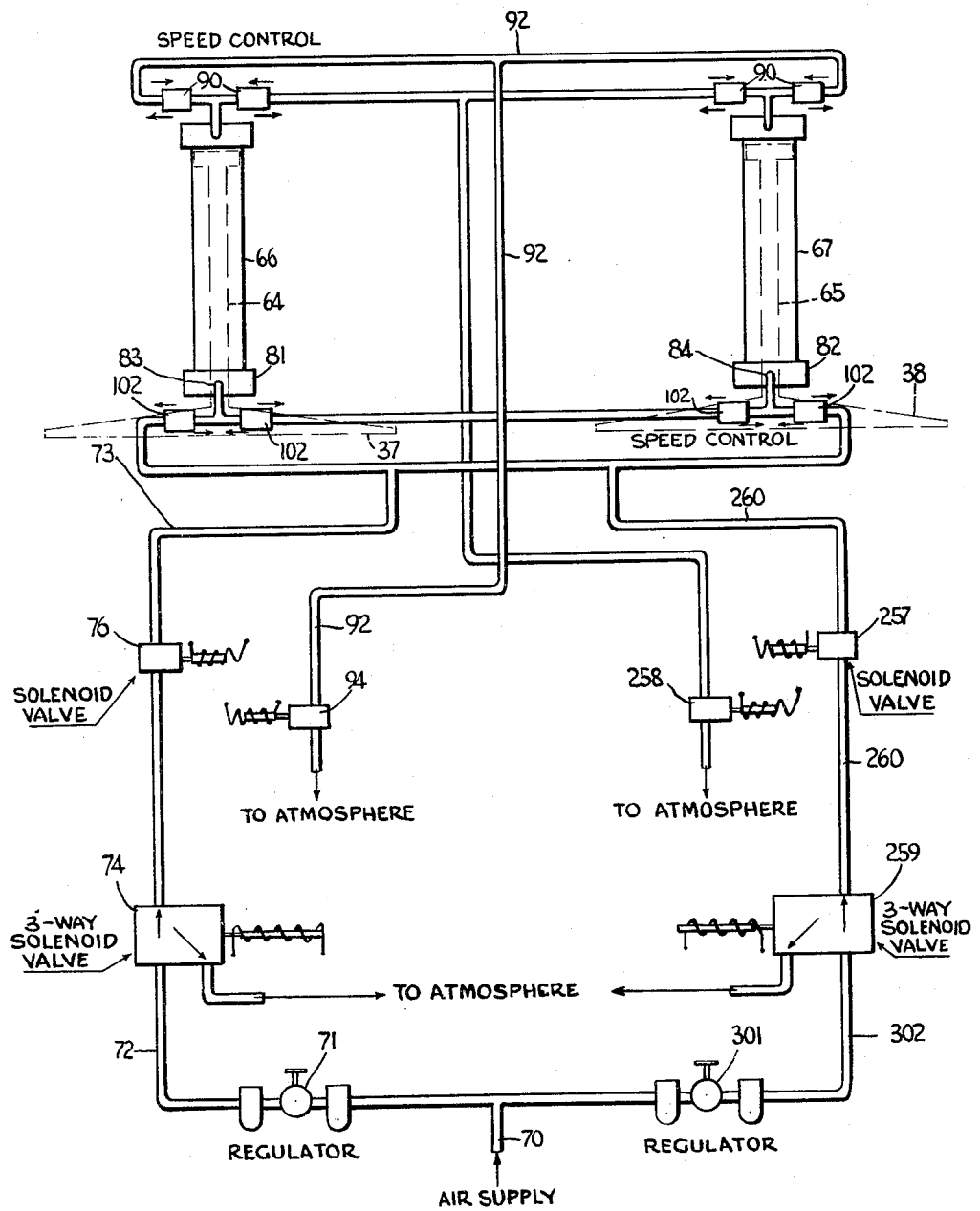

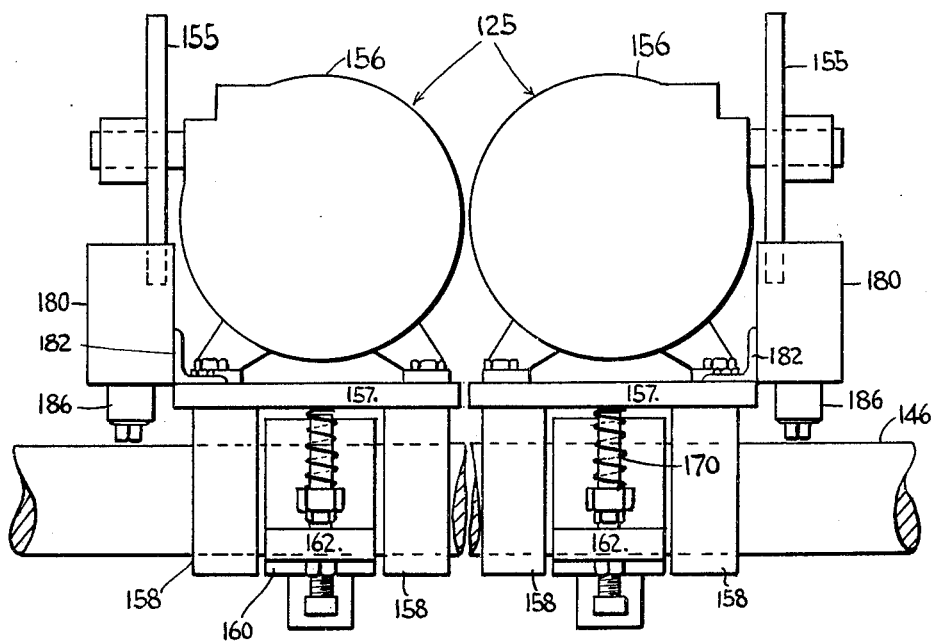
FIG. 8
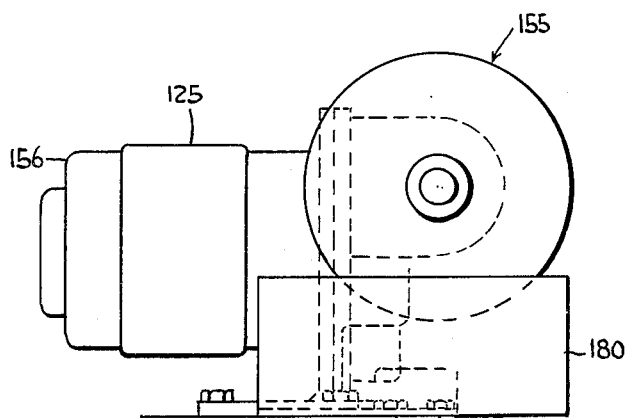
FIG. 9
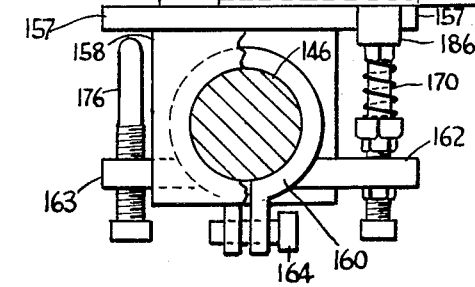
INVENTORS
WILLIAM R. CLEVER AND
HARRY O. PHALIN
BY
Oscar L. Spencer
ATTORNEY

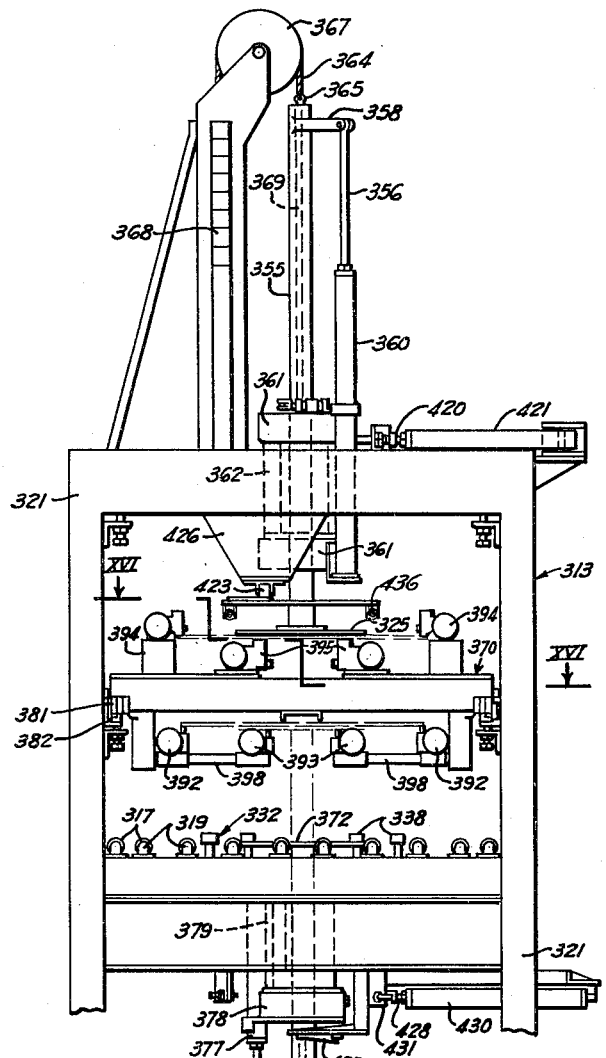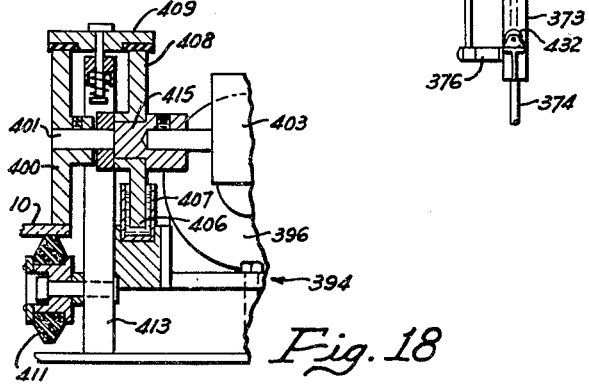

Sept. 5, 1961 W. R. CLEVER ET AL 2,999,036
METHOD OF AND APPARATUS FOR STRIPING GLASS
Original Filed Aug. 4, 1955 10 Sheets—Sheet 8

INVENTORS
WILLIAM R. CLEVER &
HARRY O. PHALIN
BY Oscar L. Spencer
THEIR ATTORNEY Sept. 5, 1961　　　W. R. CLEVER ET AL　　　2,999,036
METHOD OF AND APPARATUS FOR STRIPING GLASS
Original Filed Aug. 4, 1955　　　　　　　　10 Sheets-Sheet 9

INVENTORS,
WILLIAM R. CLEVER &
HARRY O. PHALIN
BY Oscar L. Spencer
THEIR ATTORNEY

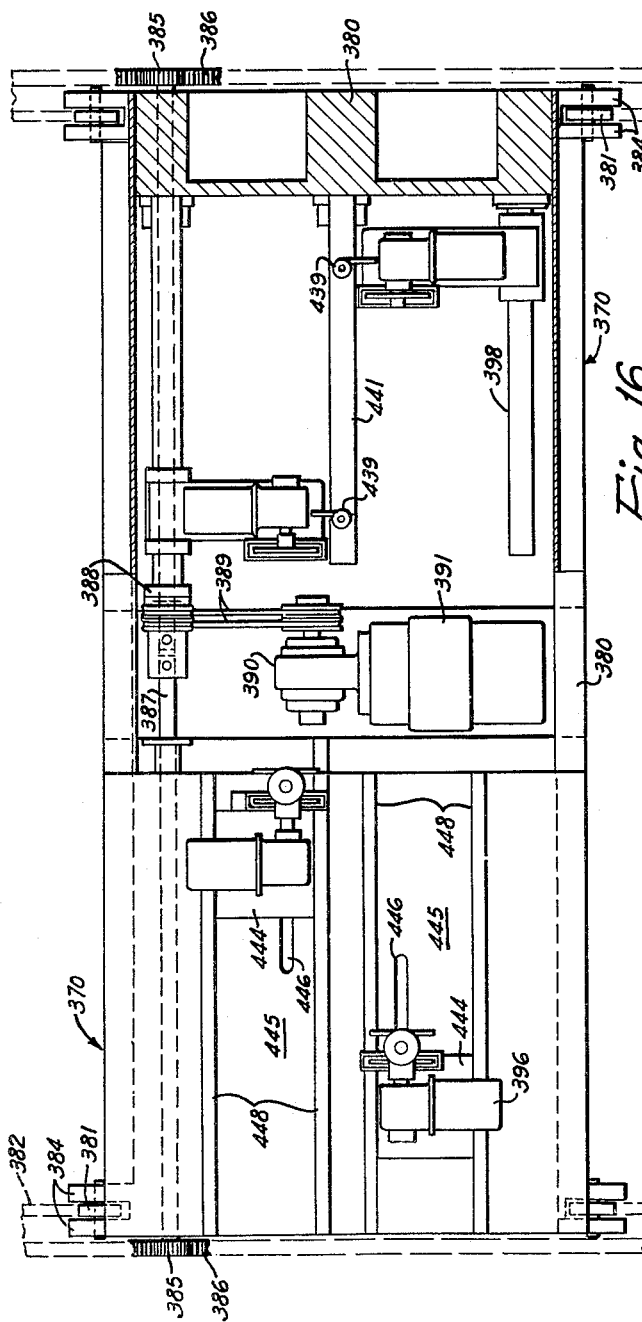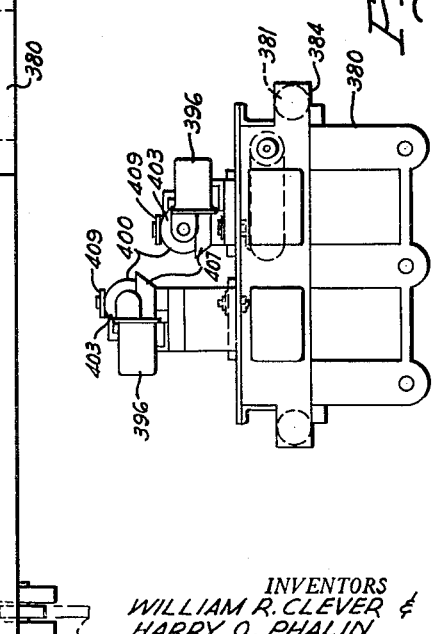

2,999,036
METHOD OF AND APPARATUS FOR STRIPING GLASS

William R. Clever and Harry O. Phalin, Lincoln, Ill., assignors to Pittsburgh Plate Glass Company, Allegheny County, Pa., a corporation of Pennsylvania
Continuation of application Ser. No. 526,402, Aug. 4, 1955. This application Apr. 15, 1958, Ser. No. 728,747
26 Claims. (Cl. 117—43)

The present invention relates to processes of and apparatus for applying stripes of a liquid material to a surface of a sheet of glass and it has particular relation to such processes and apparatus as may be employed to apply a stripe of an electrically conductive material to a surface of a glass sheet at or near its edges. This application is a continuation-in-part of our copending application, Serial No. 317,214, filed October 28, 1952, now abandoned, and a continuation of our copending application, Serial No. 526,402, filed August 4, 1955, now abandoned.

It has heretofore been proposed to construct double glazed units which can be substituted for conventional single plates or panes of glass in windows by heating the edges of two sheets of glass and fusing them together to provide a sealed monolithic unit. The units thus formed are excellent heat insulators and are characterized by permanent exclusion of moisture from the interior thereof.

A process for making units of this type is disclosed in U.S. Patent No. 2,624,979. The process comprises supporting two sheets of glass in superposed but slightly spaced relationship to each other, heating the margins of the upper sheet until they droop and become welded with the margins of the lower sheet, pulling the upper sheet upwardly to provide a chamber between the sheets and abruptly increasing the air pressure within the unit to effect filleting of the welded connection between the sheets. The units have a pore opening, either in a face or edge of the unit, to allow for equalization of the pressure of the air within the unit with atmospheric pressure during cooling and annealing of the unit.

In this process, the heating of the edges of the glass is effected by localized electrical heating. In order to initiate the electrical heating operation, it is desirable to apply a stripe of an electrically conductive material, such as colloidal graphite, on the upper sheet of glass near the edges of the sheet. Such stripe extends continuously around the periphery of the sheet and may be on either the top or bottom surface of the top sheet. An electric current is then passed through the stripe to effect heating of the stripe and the glass immediately adjacent thereto. As the temperature of the glass rises in the vicinity of the stripe, the glass itself becomes a conductor and the electrical heating can be continued in the glass even after the electrically conductive stripe has been burned away.

In order to obtain uniform heating, bending and welding of the heated portions of glass, it is essential that the conductive stripe be uniform in thickness and width so as to obtain uniform conductivity about the entire perimeter of the glass sheet. Heretofore, the colloidal graphite stripes have been applied by passing the glass between conventional rollers acting much the same as ringer rollers or nipper rollers. However, by means of such crude apparatus, it has been difficult or impossible to obtain the accurate spacing of the stripes and uniformity as to thickness and width of the coatings so essential to satisfactory performance of the subsequent welding steps.

An improved process which has been proposed comprises supporting the glass sheets upon a roller conveyor having sloped guide flanges which position the sheets with respect to a striping applicator located under the sheet. After one pair of edges is striped, the glass is indexed and is passed over rollers and between guide flanges so as to stripe the other pair of edges. An objection to such type of striping process is that occasionally the edges of the glass sheet are chipped by the guide flanges thus rendering the glass sheet unfit for use. An additional objection to such striping process is that the guide flanges on the conveyor must be adjusted each time that a sheet of different width is to be striped. A further objection to this type of process is that the pair of stripes initially applied are often marred as the glass sheet passes over the rollers of the conveyor prior to and during the application of the remaining pair of opposing edges of the sheet of glass.

In accordance with the present invention, these difficulties have been obviated by supporting the glass sheet by suitable means, for example a vacuum head, which attaches to a surface of the sheet to be striped, and passing a carriage containing a striping applicator across the glass sheet so as to stripe the edge of the sheet. This is achieved by conveying a sheet of glass on a conveyor, positioning and centering the glass sheet upon the conveyor relative to a vacuum head and striping applicator positioned in vertical alignment with the conveyor, moving the vacuum head vertically to engage a surface of the centered glass sheet, applying a vacuum to the head to grip the glass, raising the vacuum head and the glass sheet attached thereto and thereafter passing the carriage across the supported glass sheet so as to apply a stripe of an electrically conductive material to the edges of the sheet.

When the glass sheet has been thus striped, a suitable supporting means, for example a charging car such as described in the patent referred to above, is moved underneath the glass at a level above that of the conveyor, and the glass is lowered onto the charging car by the vacuum head. The vacuum is then released, the head is raised again and the charging car carries the striped sheet to the welding operation. The glass rests on small carbon or graphite knobs fastened to the top of the charging car and is not marked by these knobs.

In a preferred embodiment of the invention, at least one pair of striping rollers is passed across the supported glass sheets so as to apply a pair of stripes to opposing edges of a rectangular sheet, the sheet is then rotated or indexed 90° and the carriage is passed across the glass sheet to apply another pair of stripes to the remaining opposing edges. If the glass sheet is rectangular, two pairs of rollers may be employed, whereas if the glass sheet is square, only one pair of striping rollers need be employed.

In the welding process described in the above mentioned patent, the heated edges of the bottom sheet of glass occasionally stick to the platens upon which they are supported in the welding furnace during the welding procedure. A satisfactory method of preventing this adhesion consists of applying a stripe of a separating material, such as a micaceous material, to the bottom surface of the bottom sheet of glass along the edges of the glass sheet. This is done prior to the welding operation in a manner similar to that employed to apply the electrically conducting stripe to the edges of the top sheet of glass. Any material which will form a separating cushion between the heated glass and the platens is suitable. Such materials include those which will liberate oxygen bubbles during the heating of the edges of the glass and thereby form a separating layer between the glass and the platens. The material should be easily removable from the glass.

According to a further embodiment of the present invention, both the top and bottom sheet may be simultaneously striped and then simultaneously positioned on the charging car for the welding operation. One manner in which this can be accomplished is by placing the bottom sheet and top sheet on a conveyor with one sheet following the other sheet in direct alignment therewith, moving the two sheets along the conveyor and positioning and centering them in vertical relation to vacuum heads and striping applicators, engaging and supporting the glass sheets by means of the vacuum heads, and striping the top and bottom sheet with the electrically conductive solution and separating material respectively in the manner described above. The striped sheets are then deposited on the charging car in proper alignment for the welding operation. As described in the above mentioned patent, the charging car conveys the sheets into a preheating furnace and then into the welding furnace where they are removed from the charging car and welded into a double glazed unit. The glass sheets may be striped simultaneously in side by side position or with one sheet in vertical alignment with the other sheet.

In a process for making all glass welded double glazed units such as described above, the glass sheets are washed, striped and then welded. It is extremely important that contact by handling equipment with the washed surfaces of the glass sheets that are to form the interior of the unit must be kept to a minimum. Any marks or dirt which occur on these surfaces cannot be removed after the unit is welded. Thus, it can be seen that the provision of a method of striping the glass so as to require a minimum amount of handling of the glass is desired.

In accordance with a preferred embodiment of the invention, the top sheet is supported by a vacuum head attached to its top surface while the bottom sheet is supported by a vacuum head attached to its bottom surface. The sheets may be simultaneously striped in this manner utilizing one striping carriage. The sheets are then placed on the charging car in vertical alignment with the surfaces of the sheets which are to form the interior of the unit in touching relationship. It can be seen that by employing this method and striping apparatus, the surfaces of the sheets of glass which are to form the interior of the unit are not contacted by any material after they have been cleaned and properly aligned. Furthermore, dirt is excluded from these touching surfaces after the sheets have been striped up to the time the sheets are separated for the welding operation.

For a better understanding of the invention, reference may be had to the accompanying drawings in which like numerals refer to like parts throughout.

In the drawings:

FIG. 6 is a diagrammatic flow plan showing the pneumatic system for raising and lowering the vacuum heads employed in one embodiment of the invention;

FIG. 8 is a fragmentary elevation of a pair of striping applicators;

FIG. 9 is a side view of one of the striping applicators shown in FIG. 8;

FIG. 11 is a view in elevation of another embodiment of the invention;

FIG. 16 is a plan view taken along lines XVI—XVI of FIG. 11;

FIG. 17 is a side view of the striping carriage shown in FIGS. 11 and 12;

FIG. 18 is an enlarged elevation, partly in section, of a novel form of striping applicator employed in the apparatus illustrated in FIGS. 11, 12, 16 and 17.

Figure 1:
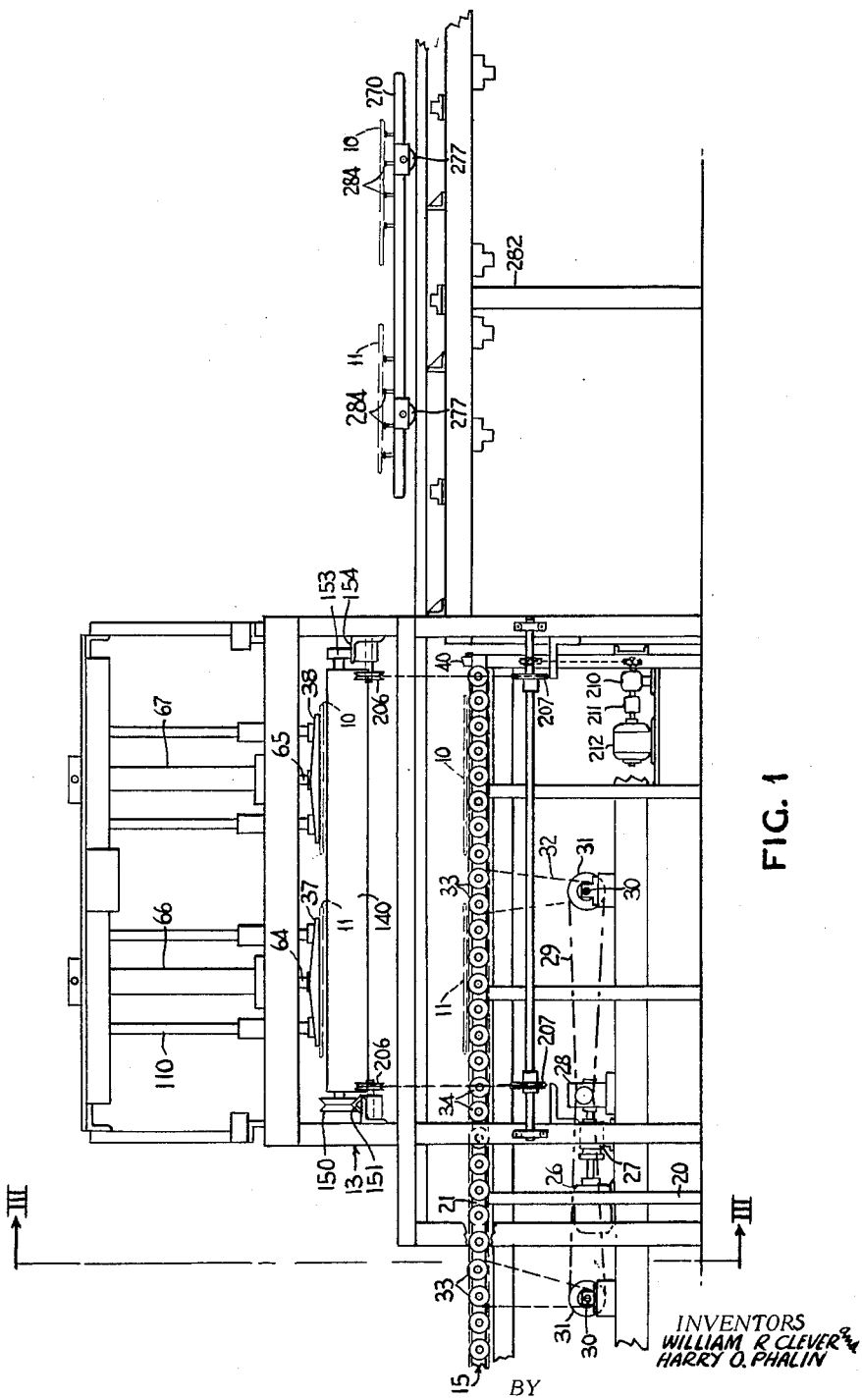
FIG. 1 is a view in elevation of an apparatus suitable for applying stripes of material to a sheet of glass in accordance with the provisions of the present invention.
Figure 2:
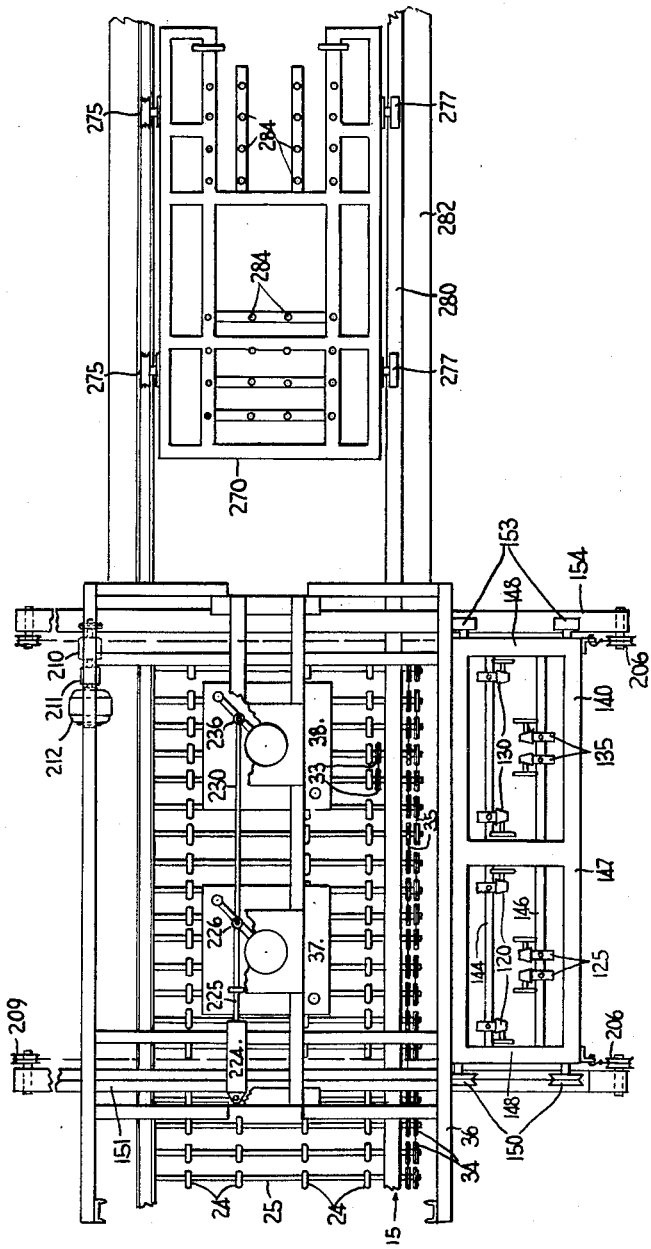
FIG. 2 is a plan view of the apparatus shown in FIG. 1.
Figures 3, 10:
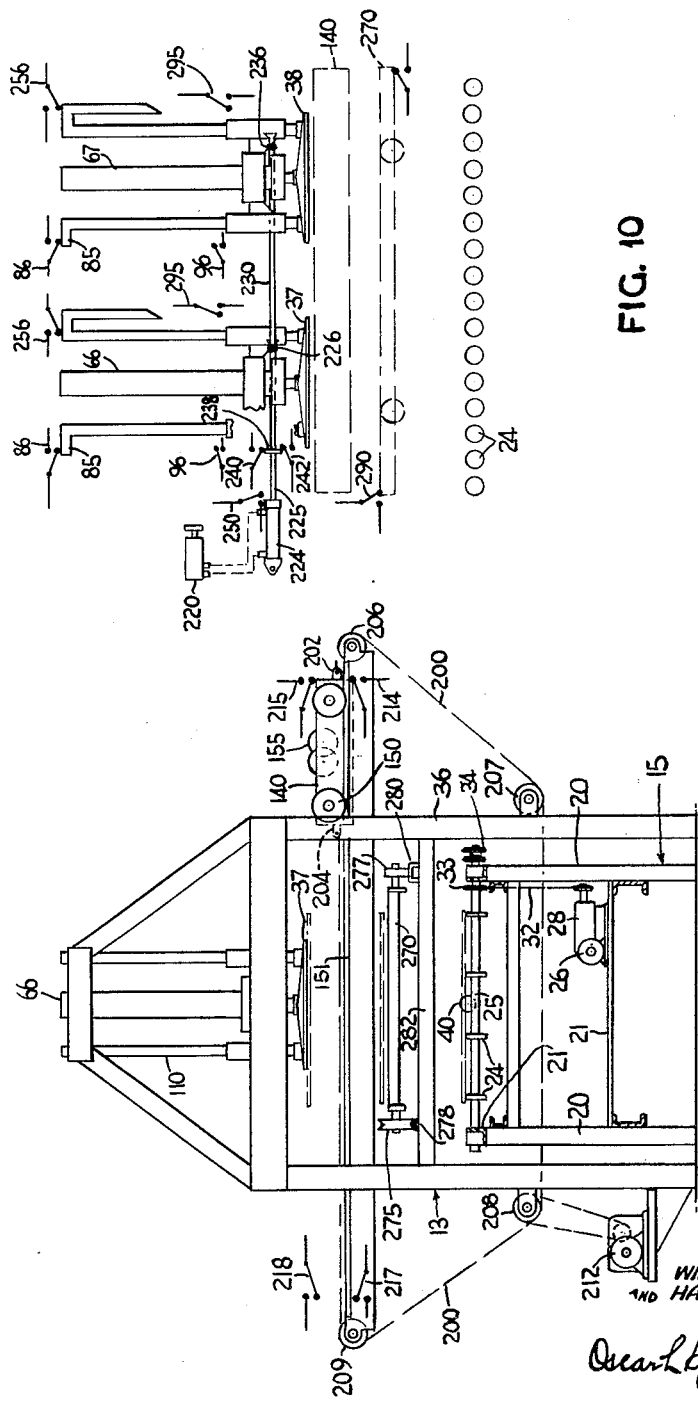
FIG. 3 is a vertical section taken along lines III—III of FIG. 1 with portions of the structure being shown in elevation.
FIG. 10 is a diagrammatic view illustrating the sequence of operations in striping the glass sheets and the electrical means for controlling the striping operation of the embodiment illustrated in FIGS. 1 to 9.

The striping apparatus is shown in FIGS. 1, 2 and 3. Glass sheet 10 which is the bottom sheet in the welding operation and glass sheet 11 which is the top sheet in the welding operation are moved into the striping apparatus 13 by means of roller conveyor 15 comprising a supporting framework having upright supports 20 and horizontal supports 21. The glass sheets are moved on graphite rollers 24 supported on rotating rods 25 which are journaled in horizontal supports 21.

Carbon rollers such as graphite rollers or rollers coated with graphite have been found to be necessary for use in transporting the glass sheets on the conveyor. The glass sheets are at a temperature of about 130° F. when they come from a washing and drying machine (not shown) and they are heated to a temperature of 200 to 250° F. by conventional electric coil heaters located under the conveyor to prepare the glass for striping.

It has been found that the electrically conducting colloidal graphite stripe functions more properly when applied at or near such temperatures because of better dispersion of graphite particles thereby providing a more uniform stripe. At such temperatures rollers made out of such materials as steel, chrome plated steel, wood, rubber, asbestos, etc. have exhibited a tendency to mark the glass. Graphite rollers or graphite coated rollers do not exhibit such tendency to mark the glass. As stated above, it is extremely important that the inner surfaces of the glass sheets be completely clean for once they have been welded together they cannot be further cleaned. This makes the use of graphite rollers of great value.

The mechanism for driving the conveyor 15 includes a reversible motor 26 connected to an electromagnetic clutch 27 which is in turn connected to a transmission device 28. The transmission device 28 drives roller chain drive 29 which drives intermediate jack shaft 30 and sprocket 31 which in turn drives chain 32. Chain 32 is connected to roller sprockets 33 connected on conveyor rods 25. Roller drive sprockets 34 are connected in pairs by means of sprocket chains 35. Such drive connections for the conveyor permit even stopping and starting of the conveyor.

The electromagnetic clutch 27 is energized electrically by control circuits. The use of such a clutch permits uniform acceleration and deceleration of the conveyor drive so as to prevent jarring of the glass over the rollers. The clutch is adjusted to give the desired amount of slip to ensure smooth starting and stopping.

The sheets 10 and 11 are moved into the striping apparatus until they are positioned and centered under vacuum heads 37 and 38. The surfaces of the vacuum heads which come into contact with the glass sheets 10 and 11 are made of aluminum. Such material has been found to be most suitable in so far as having the least tendency to mark or crack the heated glass.

Figure 4:
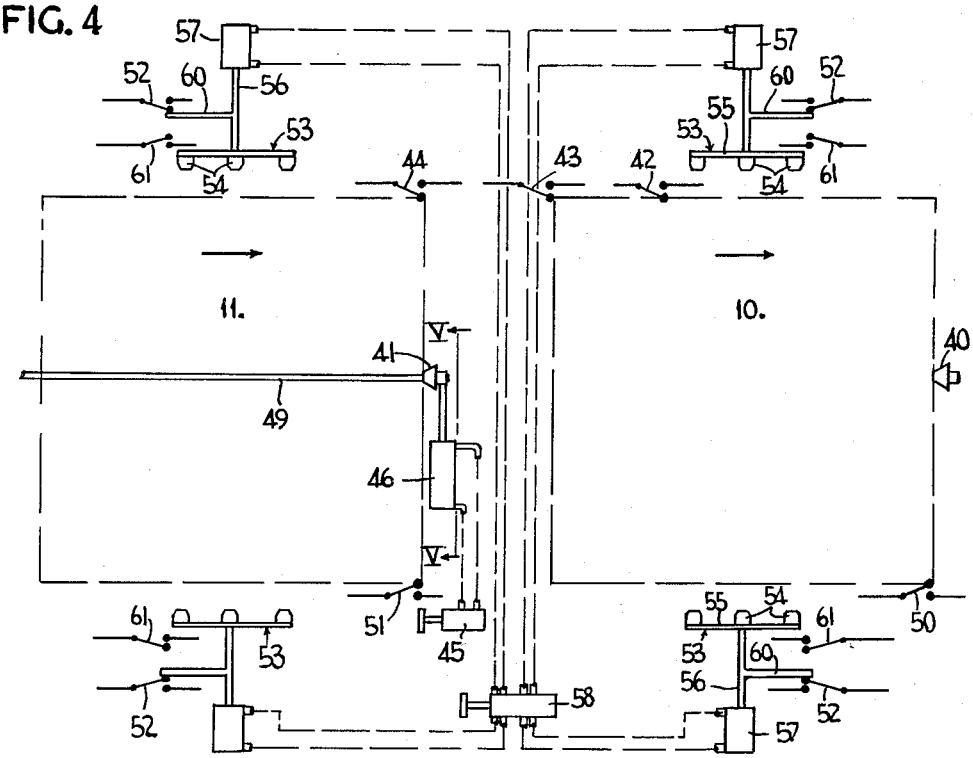
FIG. 4 is a diagrammatic view illustrating the means for centering and positioning the glass sheets on a conveyor.

A method of automatically centering and positioning the glass sheets 10 and 11 under vacuum heads 37 and 38 is illustrated diagrammatically in FIG. 4 of the drawings. The electrical connections between the various switches and valves mentioned in the description of the centering operation and all subsequent automatic operations constitute conventional sequence electrical controls operated by means of relays and switches and are not shown in detail.

The glass sheets travel in the direction shown in FIG. 4 and are stopped by end stop arms 40 and 41. Stop arm 40 is stationary but stop arm 41 rises between the conveyor rods and rollers after sheet 10 passes over it but in time to stop sheet 11 from progressing further. Stop arm 41 rises when limit switches 42, 43, and 44 are in proper sequence. They are in proper sequence when sheet 10 is engaging limit switch 42, sheet 11 is engaging limit switch 44 and limit switch 43 is unengaged due to the fact that it is between the two sheets of glass.

Figure 5:
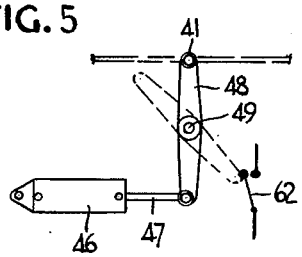
FIG. 5 is a view taken along lines V—V of FIG. 4.

The method of raising and lowering end stop arm 41 is illustrated in FIG. 5. When limit switches 42, 43, and 44 are in proper sequence a circuit is established which energizes a solenoid valve 45 to permit air to enter cylinder 46 and move piston rod 47. Piston rod 47 is connected to one end of an arm 48 which is mounted pivotally on a rod 49 mounted on the conveyor framework beneath the conveyor rollers and parallel to the direction of travel of the glass. End stop arm 41 is connected to the other end of arm 48. As the piston rod 47 is retracted, end stop arm 41 is rotated upwardly into the path of glass sheet 11.

Here again the use of the graphite rollers on the conveyor has been found to be advantageous. The conveyor rollers are permitted to rotate a small portion of a revolution, for example up to 5°, after both sheets have contacted their respective end stop arms. This is to ensure that both sheets are snug up against the end stop arms before they are centered. This motion of the graphite rollers against the stationary sheets of glass does not mark the glass. If rollers of other materials such as mentioned above are used, the glass is marked during this small rotation of the rollers. Thus a further advantage in the use of graphite rollers on conveyor 15 is seen.

The leading edges of the bottom sheet 10 and top sheet 11, actuate limit switches 50 and 51 respectively which in combination with limit switch 52 initiate a circuit which automatically disengages clutch 27 and also initiates a circuit which automatically starts the side centering means 53 to move forward a predetermined amount and center both sheets of glass on the conveyor. The centering means 53 consists of several rubber knobs 54 mounted on a steel arm 55 which is in turn connected to the end of piston rod 56 in cylinder 57. The circuit initiated by limit switches 50, 51 and 52 to start the centering operation energizes a solenoid valve 58 which permits the flow of air to one of two openings in cylinder 57 to cause piston rod 56 to move forward a predetermined distance and center the glass.

At the forward position of the piston rod 56, an arm 60 attached to piston rod 56 contacts limit switch 61. This sets up a control circuit which energizes solenoid valve 45 to permit air to enter cylinder 46 and move piston rod 47 forward so as to rotate end stop arm 41 downward. At the forward position of piston rod 47 limit switch 62 is actuated. The actuation of limit switch 62 initiates a control circuit which energizes solenoid valve 58 to cause a flow of air to the other opening in cylinder 57 which forces piston rod 56 containing side centering means 53 to return to its original position. When piston rod 56 returns to its original position, arm 60 attached thereto contacts limit switch 52 which stops the centering control sequence. The glass sheets are then ready to be engaged by vacuum heads 37 and 38 and raised into position for striping.

When end stop arm 41 and side indexing means 53 return to their normal positions, vacuum heads 37 and 38 begin to descend to the glass sheets and engage therewith. The vacuum heads 37 and 38 are connected to piston rods 64 and 65 in cylinders 66 and 67. The vacuum heads are raised and held in the up position as shown in FIGS. 1, 2 and 3 by means of air pressure applied through openings in the bottoms of cylinders 66 and 67.

The actuation of the vacuum heads by means of air pressure is shown in diagrammatic form in FIG. 6. In FIG. 6, air under pressure enters through line 70 and passes through pressure regulator 71, thence through lines 72 and 73 to solenoid valves 74 and 76 to the bottoms 81 and 82 at 83 and 84 respectively in cylinders 66 and 67. This air pressure forces the pistons 64 and 65 upward in cylinders 66 and 67 to the top of the cylinder thus holding the vacuum heads in their uppermost position where lugs 85 connected thereto are in contact with limit switches 86.

The air in the upper portion of cylinders 66 and 67 is allowed to flow by means of restricted flow to the atmosphere through air flow regulators 90, lines 92 and solenoid valve 94. This restricted flow acts as a cushion to prevent the vacuum heads from rising too rapidly. The air pressure in lines 70, 72 and 73 maintains the vacuum heads in the up position. The function of solenoid valve 94 is to maintain a closed system. This prevents any movement of the vacuum heads should there be a leak in the cylinders, etc.

The completion of the centering sequence operation initiates a circuit which energizes solenoid valves 76 and 94 to open lines 73 and 92 respectively to the atmosphere. This circuit is set up when end stop arm 41 is down thereby actuating limit switch 62, side centering means 53 are retracted thereby actuating limit switch 52 and when vacuum heads 37 and 38 are in the up position thereby placing lugs 85 (FIG. 10) in contact with limit switches 86. Solenoid valve 74 need not be energized for it is open to the atmosphere in its normal position.

Figure 7:
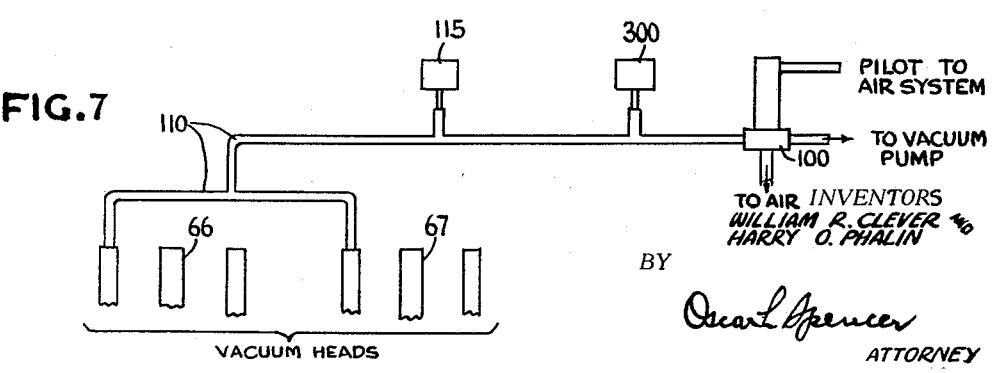
FIG. 7 is a diagrammatic flow plan of the vacuum system for the vacuum heads shown diagrammatically in FIG. 6.

The air discharged from cylinders 66 and 67 flows through flow regulators 102 which restrict the flow of air through line 73 to the atmosphere so as to allow the piston and vacuum heads to drop smoothly and slowly until lugs 85 contact and actuate limit switches 96 (FIG. 10). When limit switches 96 are actuated, they initiate a circuit which deenergizes solenoid valves 76 and 94 thereby restricting flow of air through cylinders 66 and 67 and stopping the downward movement of the vacuum heads. Limit switches 96 also set up a circuit which energizes vacuum solenoid valve 100 (FIG. 7) to open line 110 to a vacuum system.

Vacuum heads 37 and 38 engage glass sheets 10 and 11 and a vacuum is applied to them so as to cause the glass sheets to cling to the heads. This vacuum is applied through lines 110 by means of a vacuum pump which discharges the withdrawn air to the atmosphere. When a vacuum of predetermined value is reached, for example 24 to 26 inches of water, vacuum switch 115 is actuated so as to permit the vacuum heads to raise the attached glass sheets 10 and 11. The vacuum switch 115 energizes solenoid valves 74, 76 and 94 to permit air under pressure to enter lines 72 and 73 and cause the pistons 64 and 65 in cylinders 66 and 67 to rise to their original starting position.

After the glass sheets have been raised to the uppermost position as shown in FIGS. 1 to 3 inclusive, they are ready to have the electrically conductive solution applied to the edge of the top sheet 11 and the separating solution to the edges of the bottom sheet 10. This is accomplished by means of four sets of striping applicators 120, 125, 130 and 135 respectively which are mounted on a striping carriage 140. The striping carriage is shown diagrammatically in FIG. 1 and in detail in FIGS. 2 and 3. The striping applicators 125 are shown in detail in FIGS. 8 and 9. These applicators are employed to apply the electrically conductive stripe.

Striping carriage 140 consists of a rectangular framework of suitable material having two rods 144 and 146 parallel to longer sides 147 of the framework and rigidly connected to the shorter sides 148 of the framework. The carriage is supported on a set of rollers attached to each of the shorter sides 148. One pair of rollers 150 is grooved and runs along an angle 151 attached to striping apparatus framework 36 above and perpendicular to the conveyor 15. The other pair of rollers 153 are smooth and run along a smooth metal rail 154 attached to the striping apparatus framework 36 above and perpendicular to the conveyor 15.

Attached to rods 144 and 146 on the framework are the four pairs of striping applicators 120, 125, 130 and 135. The applicators are all the same therefore description of one pair is believed to be sufficient to describe all pairs.

In FIGS. 8 and 9 applicators 125 are shown. The striping applicators 125 consist of cadmium plated steel striping wheels 155 axially connected to and driven by gear reducing motors 156 which motors are rigidly mounted on platforms 157 which are in turn pivotally connected to rod 146. The platform 157 is in the shape of a table having circular holes in the legs 158 so as to permit rod 146 to run freely through the legs.

A collar 160 having wings 162 and 163 is adjustably attached to rod 146 between the legs 158 of the platform 157 by means of bolt 164. The collar 160 regulates circular movement of the striping applicator 125 with respect to the rod 146. On one wing 162 a spring 170 is attached in perpendicular alignment and in contact with the underside of the top of platform 157. This spring 170 prevents rotation of the applicator towards the spring and also operates to cause the striping wheel 155 to be in slight pressure on the surface of the glass during the striping operation. On the other wing 163 of collar 160 is screw threaded a thumb screw 176, the tip of which is located a fixed distance from the platform 157 so as to limit rotation of the striping applicator 125 in a direction opposite to that prevented by the spring 170.

It is to be noted at this point that striping applicators 125 and 135 are mounted on rod 146 so that the point of contact of striping wheels 155 with the glass sheets is lower than the point of contact of the striping wheels on striping applicators 120 and 130 with the glass sheets. This is to permit applicators 125 and 135 to pass under the glass sheets without contacting them when they are being striped by applicators 120 and 130.

The peripheral portion of the striping wheel 155 extends into a striping solution container 180 which is mounted on the platform 157 by means of angle 182 to which it is fastened. In striping applicator 125 this container holds an electrically conductive solution such as colloidal graphite. The bottom of the container has a plug 186 screw threaded therein so as to permit drainage of the container.

The striping operation is shown diagrammatically in FIGS. 3 and 10. The striping car 140 is shown in its initial position in these figures. The striping carriage 140 is connected to a chain 200 at 202 and 204. The chain 200 runs around pulleys 206, 207, 208 and 209 which are rotatably connected to the framework of the striping apparatus. Pulley 208 is connected by means of transmission device 210 and electromagnetic clutch 211 to reversible motor 212 which provides a means for moving the chain 200.

Several adjustments must be made to the striping apparatus prior to the striping operation depending upon whether or not square or rectangular sheets of glass are to be striped. For example, if square sheets of glass are to be striped at their edges, then only striping applicators 125 and 135 are used; however, if rectangular sheets of glass are to be striped, then all four pairs of striping applicators are employed during the striping operation. Thus, by means of a suitable switch the motors 156 of all the striping applicators are begun when rectangular sheets are to be striped and the motors of striping applicators 125 and 135 only are begun when square units are to be striped.

When all of the striping wheels are rotating, the edge of the wheel which is in contact with the glass in applicators 120 and 130 is moving in the opposite direction of the forward motion of the striping carriage, and the edge of the wheel which is in contact with the glass in applicators 125 and 135 is moving in the opposite direction of the return motion of the striping carriage. In other words, the direction of movement of the edge of each of the striping wheels when it is applying a stripe is opposite to the direction of movement of the striping carriage at such time.

It has been found that more satisfactory stripes are obtained when the speed of the edge of the striping wheel is greater than the speed of the striping carriage as it moves underneath the glass. For example, a good stripe for welding purposes is obtained when the speed of the striping carriage is about 120 inches per minute and the peripheral speed of the striping wheel is about 190 inches per minute. Ratios of striping wheel peripheral speed to striping carriage speed of 2 to 1 and greater can be employed.

A good stripe for welding purposes is a stripe which has uniform resistance per unit length. The resistance per unit length is a function of the amount of electrically conductive material deposited per unit length. Thus, a good stripe for welding purposes is one in which a uniform amount of electrically conductive material is deposited per unit length. The rotation of the striping wheels so that the peripheral speed of the wheel is greater than the lineal speed of the carriage during the striping operation enables the deposition of a uniform amount of material on the surface of the glass per unit length.

The striping operation begins when vacuum heads 37 and 38 return to their normal up position and lugs 85 contact limit switches 86. When limit switches 86, vacuum switch 115 and limit switches 214 and 215 are actuated, a circuit is completed to energize electromagnetic clutch 211 and cause it to engage motor 212. This causes the striping carriage 140 to move across underneath glass sheets 10 and 11 with striping applicators 120 and 130 applying stripes of their respective solutions to the leading and trailing edges of the glass sheets.

After passing underneath the glass sheets, the striping carriage strikes limit switches 217 and 218. The engagement of limit switch 217 completes a circuit which disengages the clutch 211. Motor 212 is then stopped and begun in the opposing direction.

The operation of limit switch 218 depends upon whether square or rectangular double glazed units are being produced. If square units are being produced, the engagement of limit switch 218 by striping car 140 stops the motors 156 of striping applicators 125 and 135. However, if rectangular units are being produced, the engagement of limit switch 218 by striping car 140 has no effect on the motors 156.

The next step in the striping operation is the indexing of the vacuum heads and glass sheets connected thereto through an arc of 90° so that the remaining opposing parallel edges may be striped on the return trip of the striping carriage 140 to its original position. The means for indexing is shown in FIG. 2 with a portion of the striping apparatus superstructure being broken away to permit such showing. During the indexing, a cam (not shown) causes the piston rods 64 and 65, vacuum chucks 37 and 38 and glass sheets 10 and 11 to move vertically to different levels for striping by the pairs of applicators mounted at different levels.

The indexing of the vacuum heads is effected by the actuation of limit switches 217 and 218 to energize a solenoid valve 220 which in turn permits flow of air to cylinder 224 which is mounted on the striping apparatus framework. This causes piston rod 225 to move inward. One end of piston rod 225 is connected to vacuum head 37 at 226. A rod 230 connects vacuum heads 37 and 38 at 226 on vacuum head 37 and at a similar position 236 on vacuum head 38. When the striping carriage 140 is in its starting position, the piston rod 225 is in an extended position. After the striping carriage 140 passes initially under the glass sheets 10 and 11, the piston rod 225 is retracted a predetermined amount this indexing the vacuum heads 37 and 38 through a 90° arc. The use of a separate cylinder and piston for indexing each vacuum head separately is also contemplated.

As shown in FIG. 10, the piston rod 225 has a lug 238 on it. When the piston is in the extended position, this lug is in contact with limit switches 240 and 242. As lug 238 releases limit switch 242 a circuit is completed which starts the striping motors 156 and striping wheels 155 in striping applicators 125 and 135 in the reverse direction from their previous rotation. This sequence occurs, of course, only when square double glazed units are being produced. When rectangular units are produced the striping wheels 155 of applicators 125 and 135 continue their rotation in their original direction as described above. The release of limit switch 240 partially closes a circuit which will be later described.

When piston rod 225 has completed the 90° indexing of the vacuum heads 37 and 38, the lug 238 engages limit switch 250 which in turn completes a circuit to energize electromagnetic clutch 211. This action connects the motor 212 to the striping carriage drive to cause the striping carriage to travel back under the glass sheets 10 and 11 to its original position where it again engages limit switches 214 and 215. The engagement of limit switch 215 completes a circuit which deenergizes the clutch 211 thereby arresting the motion of the striping carriage. When the striping carriage 140 engages limit switch 215, solenoid valve 220 is again actuated to cause piston rod 225 to move forward and index the vacuum heads 37 and 38, 90° back to their original position. As the vacuum heads return to their original position, they strike limit switches 256.

In the meantime, charging car 270 is moved into position under the vacuum heads and glass sheets 10 and 11 to receive them. The charging car 270 consists of a rectangular metal frame work as viewd from above in FIG. 2 mounted on rollers 275 and 277. Rollers 275 are grooved and run on tubular track 278. Rollers 277 are smooth and run on metal strip 280. The runners 278 and 280 are mounted on suitable metal framework 282 which supports the runners at a height intermediate to that of the conveyor 15 and the striping carriage 140. Mounted on and projecting upwardly from the charging car 270 are small carbon or graphite knobs 284 upon which the glass sheets are deposited by the vacuum heads.

As the charging car 270 comes into its proper position on the runners 278 and 280 underneath the vacuum heads 37 and 38, the forward end of the charging car strikes limit switch 290. The engagement of limit switch 290 completes a circuit with limit switches 256 to energize solenoid valves 257 and 258 shown diagrammatically in FIG. 6. This vents lines 260 to the atmosphere to release the pressure in cylinders 66 and 67 on pistons 64 and 65 so as to permit the vacuum heads to start to descend. When the vacuum heads reach the charging car level, limit switches 295 are actuated to complete a circuit with limit switch 290 which deenergizes solenoid valves 257 and 258 to close lines 82 and 92 and stop the descent of the vacuum heads.

The actuation of limit switches 290 and 295 also initiate a circuit which deenergizes solenoid valve 100 to open the vacuum system to the atmosphere. This releases the sheets of glass from the vacuum heads and deposits them on the charging car. As the pressure in the vacuum system returns to atmospheric pressure or nearly so, vacuum switch 300 is actuated to set up a circuit which energizes solenoid valves 257, 258 and 259 to permit air under pressure to pass though pressure regulator 301 and lines 302 and 260 to move pistons 64 and 65 upward to their original position. The charging car is then ready to take the glass sheets on to the welding operation.

FIGS. 11 to 18 illustrate a preferred embodiment of the present invention. In this embodiment, the surfaces of the glass sheets which are to form the inside of the double glazed unit are not touched during the striping operation. Glass sheets 10 and 11 are moved into a striping apparatus 313 by means of roller conveyor 315. The glass sheets are moved on graphite rollers 317 mounted on rotating rods 318 journaled in horizontal supports 319 which are affixed to the conveyor framework 320 which is a part of the general framework 321 of the striping apparatus. The conveyor 315 may be driven by any suitable mechanism (not shown).

The sheet 11 is moved first into the striping apparatus on a conveyor where it is positioned and centered under vacuum head 325. The sheet 11 strikes stop arms 327 which, through suitable means (not shown), actuate piston 329 in cylinder 330 to start the centering mechanism 332 into operation. The piston 329 is affixed to a lug 333 which is attached to annular cam mechanism 334.

Figure 13:
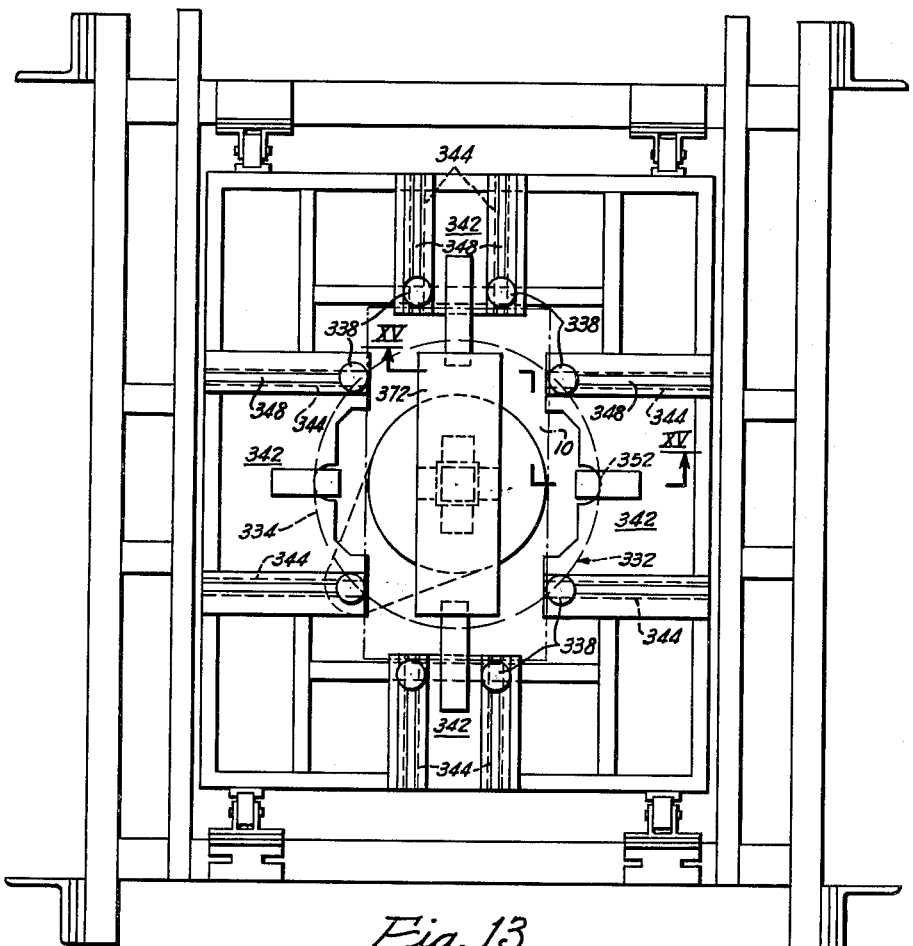
FIG. 13 is a view taken along lines XIII—XIII of FIG. 12 with the conveyor rollers of FIG. 12 omitted for purposes of clarity.
Figure 14:
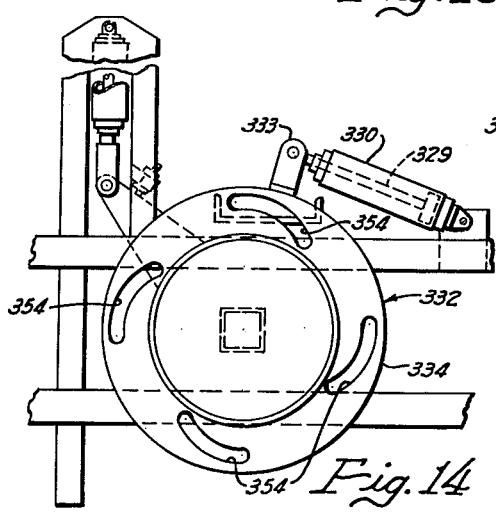
FIG. 14 is a plan view illustrating the cam actuation of the centering apparatus shown in FIGS. 11 to 13.
Figure 15:
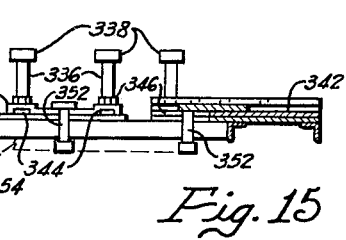
FIG. 15 is a view partly in section taken along lines XV—XV of FIG. 13.

The centering mechanism and operation is shown in detail in FIGS. 13, 14 and 15. The glass 11 is centered on the conveyor 315 by the inward movement of six upright positioning members 336 in combination with arms 327. Mounted on the uppermost portions of the members 336 and the arms 327 are resilient, cylindrical rubber elements 338. The members 336 and arms 327 are rigidly supported on plates 342 having channels 344 on the underneath side thereof. The plates 342 rest on support means 346 having raised portions 348 thereon so that the channels 344 fit over the raised portions 348. The plates 342 slide back and forth horizontally over the raised portions 348.

Depending from the center of the plate 342 are cam rods 352 which rest in cam slots 354 in annular cam 334. It can be seen that movement of the piston 329 causes annular cam 334 to rotate and move the cam rods 352 inwardly toward the axis of the annular cam 334 during their travel from one end of the cam slots 354 to the other. The inward movement of the cam rods 352 causes plates 342 to slide inwardly over raised portions 348. This, in turn, causes positioning members 336 and stop arms 327 to move inwardly in a horizontal plane toward the edges of the glass sheet. The resilient members 338 engage the edges of the sheet 11 and center it in vertical alignment with respect to the vacuum head 325.

When the glass sheet 11 is centered, the vacum head 325 attached to supporting post 355 descends from its normal up position and engages the glass sheet. The post 355 and vacuum head 325 are actuated by means of piston 356 connected to lugs 358 attached to the post 355. The piston 356 moves in cylinder 360 rigidly mounted on cylinder 361 which is in turn supported on and rotates on bearing 362 which is affixed to the striping apparatus framework 321. The post 355 and vacuum head 325 are normally maintained in an up position by means of rope 364 attached to the post at 365. The rope passes over a pulley 367 and is connected to weights 368.

A vacuum is applied to the head 325 when it is in contact with the sheet of glass 11. The vacuum is applied through a conduit 369 in the center of post 355, which conduit is connected to a vacuum source (not shown). The positioning members 336 and stop arms 327 are retracted and the vacuum head, with the glass attached thereto, is raised to its normal up position above the level of a striping carriage 370.

The centering operation is repeated for glass sheet 10. When the sheet 10 is centered, a vacuum head 372 is raised slightly into touching contact with the bottom surface of the sheet 10. The lowest position of the vacuum head 372 is slightly below a plane drawn through the uppermost points of the conveyor rollers 317. The vacuum head is supported on post 373 having a vacuum conduit 374 in the center thereof connected to a suitable source of vacuum (not shown).

A vacuum is applied to the head 372 to grip the glass 10, the positioning members 336 and stop arms 327 are retracted and the vacuum head 372 with sheet 10 attached thereto is raised upwardly into position for the striping operation. The upward movement of the post 373 and vacuum head 372 is effected by means of piston 375 connected to the post at lug 376. The piston moves vertically in cylinder 377 which is affixed to cylinder 378 which is mounted on and rotates on bearing 379 rigidly connected to the striping apparatus framework 321.

In the embodiment shown in FIGS. 11 to 18, the edges of the top sheet are striped with the electrically conductive material on the top surface; and the edges of the bottom sheet are striped on the bottom surface with the micaceous or separating material. This is in contrast to the embodiment shown in FIGS. 1 to 10 wherein both sheets are striped along their edges on their underneath surfaces. The edges of the sheets are striped with the respective materials by means of rollers passing over the surfaces in the areas where they are to be striped. The rollers are mounted on striping carriage 370.

The striping applicators and carriage are shown in detail in FIGS. 16 to 18, inclusive. The striping carriage 370 is composed of rectangular framework 380 which moves on wheels 381 along flange tracks 382 affixed to the framework 321. The wheels 381 are mounted in bearing members 384 rigidly attached to the framework 380. The carriage 370 is caused to move along the flange tracks by means of pinion 385 moving on rack 386 affixed to framework 321. The pinion is mounted on shaft 387 supported in bearings 388 on the carriage framework 380. The shaft is driven by power supplied through a belt 389 attached through gear reduction unit 390 to motor 391 mounted on the framework 380.

Four pairs of striping applicators 392, 393, 394 and 395 are mounted on the striping carriage 370. Each applicator is driven by its own motor 396. The striping applicators 392 are employed to apply the separating material to the bottom edges of the bottom sheet along the short sides and the striping applicators 393 are employed to apply the separating material to the bottom edges of the bottom sheets along the long sides. These applicators are identical in structure and operation to the striping applicators 125 shown in FIG. 8 and described above.

The applicators 392 and 393 are mounted on L-shaped tubular supports 398 depending from the striping carriage framework 380 in an underslung manner. This arrangement permits the main portion of the striping carriage framework 380 to pass above the lower sheet at the same time the striping applicators 392 and 393 are passing underneath the bottom sheet.

The striping applicators 394 are employed to apply the stripe of electrically conductive material to the top edges of the top sheet along the short sides and the striping applicators 395 are employed to apply the electrically conductive material to the top edges of the top sheet along the longer sides. The striping applicators 394 and 395 are of slightly different structure than the applicators 392 and 393. This is to permit application of the stripe on the top surface of the edge of the sheet as contrasted to the bottom surface of the sheet. The striping applicators 394 and 395 are shown in greater detail in FIG. 18. As illustrated, motor 396 is employed to drive the striping wheel 400 mounted on shaft 401 through gear reduction unit 403. The striping solution 406 in reservoir 407 is indirectly transferred to the edges of the striping wheel 400 by means of pickup wheel 408 and transfer wheel 409. The positive movement of striping wheel 400 causes the transfer wheel 409 to rotate by frictional engagement therewith and the rotation of the transfer wheel 409 causes the pickup wheel to rotate through frictional engagement therewith. The meeting surfaces of the various wheels transfer the striping solution from the reservoir to the edge of the sheet 10.

A backup wheel 411 rotates at a given distance directly underneath the striping wheel 400 and maintains the glass in positive connection with the striping wheel. The backup wheel 411 is mounted for free rotation on shaft 412 which is journaled in structural support 413. Pickup wheel 408 is a freely rotating wheel and rotates on bearing 415 mounted on shaft 401. The transfer wheel 408 is a freely rotating wheel mounted on shaft 416 which is attached to support 413.

Figure 12:
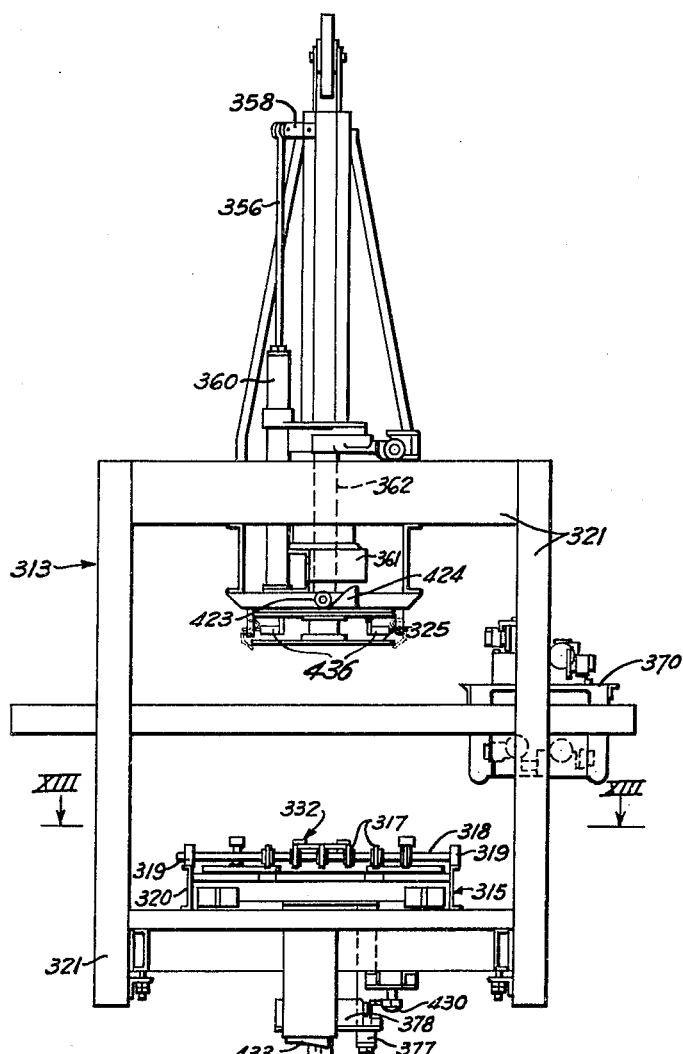
FIG. 12 is a side view of FIG. 11.

Referring to FIGS. 11 and 12, the striping operation is described. The motors 396 of the striping applicators run continuously. When the glass sheets 10 and 11 have been centered and raised to the proper position above the conveyor 315, motor 391 is started and the carriage 370 is moved across the tracks 382 by means of the rack 386 and pinion 385.

As the striping carriage moves past the glass sheets, applicators 392 apply stripes to the two shorter edges of the bottom sheet 10 on the bottom surface thereof and the applicators 394 apply stripes to the two shorter edges on the top surface of the top sheet 11. After these sides have been striped and the carriage has moved across the striping apparatus framework on the tracks 382, the vacuum heads 325 and 372 with glass sheets 11 and 10 attached thereto, respectively, are indexed 90° preparatory to striping the remaining opposed pairs of longer edges of the sheets.

The indexing of the vacuum heads and glass sheets is described separately. Vacuum head 325 and glass sheet 10 attached thereto are rotated through 90° by the movement of piston 420 in cylinder 421. The striping applicators 394 and 395 are mounted at different levels on the carriage 370 so as to permit their use separately during the two passes of the striping carriage. During the striping of the shorter sides of sheet 11 by applicators 394, the applicators 395 pass under and out of contact with the glass sheet 11. On the return trip, the vacuum head 325 and sheet 11 are indexed and lowered several inches in order to be engaged with the applicators 395.

The lowering of the vacuum head 325 and glass sheet 11 attached thereto is accomplished by roller 423 riding on cam 424 which is rigidly attached to the vacuum head 325. The roller 423 is mounted for free rotation on platform 425 which is rigidly affixed to the striping apparatus framework 321 by means of platform supports 426.

Striping applicators 392 and 393 are likewise mounted at different levels on the L-shaped supports 398 depending from the striping carriage 370 to permit separate use thereof during the passage of the striping apparatus back and forward on the tracks 382. The shorter sides of the sheet 10 are striped by applicators 392 as the applicators 393 pass under the sheet. The indexing and lowering of the vacuum head 372 and glass 10 attached thereto is accomplished by the motion of piston 428 in cylinder 430.

The piston 428 is attached to the cylinder 378 at 431. During the 90° indexing of the vacuum head 372 and glass sheet 10 attached thereto, they are caused to move vertically by the action of roller 432 on cam 433. The roller is attached to the post 373 and the cam is rigidly connected to the striping apparatus framework 321. On the return trip of the striping carriage 370, the applicators 393 engage the longer bottom edges of the sheet 10 and apply the stripes of separating material to them.

After the striping carriage 370 has returned to its original position, the vacuum heads 325 and 372 with glass sheets 10 and 11 respectively attached thereto are indexed 90° back to their original striping position. The vacuum head 325 and glass sheet 10 attached thereto are lowered until sheet 10 is in superposed, touching relationship to sheet 11. Fingers 434, supported on vacuum head 325, are rotated outwardly and downwardly into position to support both sheets of glass. The vacuum in head 372 is released and the head is moved downwardly to its lowermost position preparatory for another striping operation.

Figure 19:
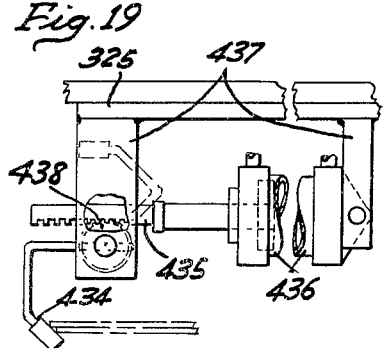
FIG. 19 is an enlarged partial elevation of a finger mechanism shown in FIGS. 11 and 12.

The operation of the fingers 434 is illustrated in FIG. 19. The fingers 434 are actuated by a rack 435 in the form of a piston operating in cylinder 436 attached to vacuum head 325 by supporting brackets 437. The rack engages a pinion 438 pivotally mounted on another supporting bracket 437. The fingers 434 extend from the pinion 438 and are rotated in and out of position by the action of the rack 435 and pinion 438. The fingers extend under the bottom sheet at about a 45° angle with two fingers on each of two opposing sides of the sheet. Other arrangements of the fingers may be employed within the skill and imagination of the art.

Next, a suitable charging carriage (not shown) is moved under the glass sheets. The vacuum head 325 and glass sheets 10 and 11 are lowered to deposit the glass on the charging carriage. The fingers 434 are retracted and the vacuum head 325 is returned to its normal up-position. The sheets 10 and 11 are deposited one on top of the other in touching relationship and in proper vertical alignment for preheating and welding. By placing the sheets in touching relationship, the surfaces which are to form the inside of the unit are protected from handling marks and accumulation of foreign material thereon. The charging carriage is then moved to the preheating station.

The operation of the striping apparatus has been described with respect to the striping of rectangular sheets wherein all four sets of striping applicators 392, 393, 394 and 395 are employed. If square sheets are to be striped, only two of the four sets need be employed. Usually these will be striping applicators 393 and 395.

These applicators as well as applicators 392 and 394 may be adjusted on the striping carriage framework 380 to accommodate different sized sheets in the striping operation. The manner of their adjustment can be described in conjunction with further description of FIG. 16. Striping applicators 392 and 393 are rotatably connected to tubular supports 398 and may be moved horizontally along these tubes to achieve the proper positions for the various sized sheets to be striped. The height of applicators 392 may be adjusted by screws 439 screw-threaded into lug 440 attached to the applicators 392 and 393. The bottom portion of the screw engages the support bar 441 and rotation of the screw moves the applicator vertically with respect to the bar 441.

Striping applicators 394 and 395 are mounted on plates 444 which in turn are attached to plates 445 through slots 446 by means of screws and bolts or other fastening means (not shown). When it is desired to adjust the positions of the applicators 394 and 395, the fastening means are loosened and the plates 444 are moved horizontally over plates 445 between guide bars 448 to the proper lateral position.

The striping apparatus shown in FIGS. 11 to 18 enables the striping of a pair of glass sheets in superposed relationship as contrasted to side by side relationship provided for in the apparatus shown in FIGS. 1 to 10. Further, the apparatus shown in FIGS. 11 to 18 provides means for striping either the top or bottom edges of the sheets. It can be seen that various combinations of the embodiments shown and described above can be made to achieve the desired results.

The apparatus illustrated in FIGS. 11 to 18 is especially useful for applying stripes of material to the edges of sheets of glass which are to be electrically welded into a double glazed unit. This is because it provides means to stripe the sheets without touching the surfaces of the sheets which are to form the interior of the welded unit, i.e., the bottom surface of the top sheet and the top surface of the bottom sheet. By depositing the striped sheets in vertical alignment and in touching relationship, the critical surfaces which are to form the inside of the unit are not touched and are protected from the beginning of the striping operation through the remainder of the manufacturing process.

Although the invention has been described in detail with respect to the embodiments above, it is to be understood that such details are not to be limitations upon the scope of the invention except insofar as set forth in the accompanying claims.

We claim:

1. A method of applying a stripe of a liquid material to a sheet of glass bounded by at least two pair of opposite spaced edges comprising supporting said sheet by contact only with a non-marginal area of one of its major surfaces, fixedly positioning said so supported sheet for striping, and applying stripes of a liquid material simultaneously to a pair of opposite spaced edges of said sheet.

2. A method of applying a stripe of a liquid material to a sheet of glass comprising supporting said sheet by contact only with a non-marginal area of one of its major surfaces, fixedly positioning said so supported sheet for striping, applying stripes of a liquid material simultaneously to one pair of opposite spaced edges of said sheet, rotating said so supported sheet through an angle of substantially 90 degrees, again fixedly positioning said so supported sheet for striping, and applying stripes of a liquid material simultaneously to another pair of opposite spaced edges of said sheet.

3. An apparatus for applying a stripe of a liquid material to a sheet of glass bounded by at least two pair of opposite spaced edges comprising means for supporting said sheet by contact only with a non-marginal area of one of its major surfaces and fixedly positioning said sheet for striping, and means for applying a stripe of a liquid material to the edges of said sheet, said last-named means being so constructed and arranged to apply said stripe simultaneously to a pair of opposite spaced edges of said sheet.

4. An apparatus for applying a stripe of a liquid material to a sheet of glass comprising means disposed about a fixed axis for supporting said sheet by contact only with a non-marginal area of one of its major surfaces, said supporting means being so constructed and arranged for fixedly positioning said so supported sheet for striping one pair of its opposite spaced edges and indexing about said fixed axis through an angle of substantially 90 degrees for fixedly positioning said so supported sheet for striping another pair of its opposite spaced edges, and means for applying stripes of a liquid material simultaneously to opposite spaced edges of said sheet.

5. A method of applying stripes of a liquid material to two sheets of glass simultaneously which are to be placed in superposed, spaced relation and electrically welded to form a multiple glazed unit which comprises engaging only a non-marginal area of a major surface of the top sheet and thus supporting and positioning the top sheet for striping, engaging only a non-marginal area of a major surface of the bottom sheet and thus supporting and positioning the bottom sheet for striping in substantial aligned spaced relation to the top sheet, and passing striping applicators across the so supported and positioned sheets and in contact therewith so as to apply stripes of liquid material to the edges of the sheets.

6. A method of applying stripes of a liquid material to two sheets of glass simultaneously which are to be placed in superposed, spaced relation and electrically welded to form a multiple glazed unit which comprises engaging only a non-marginal area of a major surface of the top sheet and thus supporting and positioning the top sheet for striping, engaging only a non-marginal area of a major surface of the bottom sheet and thus supporting and positioning the bottom sheet for striping in substantial aligned spaced relation to the top sheet, passing striping applicators across the so supported and positioned sheets and in contact therewith so as to apply stripes of liquid material to the edges of the sheets, and bringing the two striped sheets together in superposed relation for further transportation with a surface of the top sheet in touching relation with a surface of the bottom sheet.

7. A method of applying stripes of a liquid material to two sheets of glass simultaneously which are to be placed in superposed, spaced relation and electrically welded to form a multiple glazed unit which comprises engaging only a non-marginal area of a major surface of the top sheet and thus supporting and positioning the top sheet for striping, engaging only a non-marginal area of a major surface of the bottom sheet and thus supporting and positioning the bottom sheet for striping in substantial horizontal aligned spaced relation to the top sheet, passing striping applicators across the so supported and positioned sheets and in contact therewith so as to apply stripes of liquid material to the edges of the sheets, and bringing the two striped sheets together in superposed relation for further transportation with a surface of the top sheet in touching relation with a surface of the bottom sheet.

8. A method of applying stripes of a liquid material to two sheets of glass simultaneously which are to be placed in superposed, spaced relation and electrically welded to form a multiple glazed unit which comprises engaging only a non-marginal area of a major surface of the top sheet and thus supporting and positioning the top sheet for striping, engaging only a non-marginal area of a major surface of the bottom sheet and thus supporting and positioning the bottom sheet for striping in substantial vertical aligned spaced relation to the top sheet, passing striping applicators across the so supported and positioned sheets and in contact therewith so as to apply stripes of liquid material to the edges of the sheets, and bringing the two striped sheets together in superposed relation for further transportation with a surface of the top sheet in touching relation with a surface of the bottom sheet.

9. A method of applying stripes of a liquid material to two sheets of glass simultaneously which are to be placed in superposed, spaced relation and electrically welded to form a multiple glazed unit which comprises engaging only a non-marginal area of a major surface of the top sheet and thus supporting and positioning the top sheet for striping, engaging only a non-marginal area of a major surface of the bottom sheet and thus supporting and positioning the bottom sheet for striping in substantial aligned spaced relation to the top sheet, passing striping applicators across the so supported and positioned sheets and in contact therewith so as to simultaneously apply stripes of liquid material first to one pair of opposite spaced edges of each sheet and then to another pair of opposite spaced edges of each sheet.

10. A method of applying stripes of a liquid material to two sheets of glass simultaneously which are to be placed in superposed, spaced relation and electrically welded to form a multiple glazed unit which comprises engaging only a non-marginal area of a major surface of the top sheet and thus supporting and positioning the top sheet for striping, engaging only a non-marginal area of a major surface of the bottom sheet and thus supporting and positioning the bottom sheet for striping in substantial horizontal aligned spaced relation to the top sheet, passing striping applicators across the so supported and positioned sheets and in contact therewith so as to simultaneously apply stripes of liquid material first to one pair of opposite spaced edges of each sheet and then to another pair of opposite spaced edges of each sheet, and bringing the two striped sheets together in superposed relation for further transportation with a surface of the top sheet in touching relation with a surface of the bottom sheet.

11. A method of applying stripes of a liquid material to two sheets of glass simultaneously which are to be placed in superposed, spaced relation and electrically welded to form a multiple glazed unit which comprises engaging only the top surface of the top sheet and thus supporting and positioning the top sheet for striping, engaging only the bottom surface of the bottom sheet and thus supporting and positioning the bottom sheet for striping in substantial vertical aligned spaced relation to the top sheet, passing striping applicators across the so supported and positioned sheets and in contact therewith so as to simultaneously apply stripes of liquid material first to one pair of opposite spaced edges of each sheet and then to another pair of opposite spaced edges of each sheet, and bringing the two striped sheets together in superposed relation for further transportation with a surface of the top sheet in touching relation with a surface of the bottom sheet.

12. An apparatus for applying stripes of a liquid material to two sheets of glass which are to be placed in superposed, spaced relation and electrically welded to form a multiple glazed unit which comprises means for engaging one major surface of the top sheet of glass and supporting and positioning it for striping without touching the other major surface of the top sheet, means for engaging one major surface of the bottom sheet of glass and supporting and positioning it in substantial aligned spaced relation to said top sheet for striping without touching the other major surface of the bottom sheet, and means for applying a stripe of liquid material around the edges of the sheets of glass while so supported.

13. An apparatus for applying stripes of a liquid material to two sheets of glass which are to be placed in superposed, spaced relation and electrically welded to form a multiple glazed unit which comprises means for engaging one major surface of the top sheet of glass and supporting and positioning it for striping without touching the other major surface of the top sheet, means for engaging one major surface of the bottom sheet of glass and supporting and positioning it in substantial aligned spaced relation to said top sheet for striping without touching the other major surface of the bottom sheet, and means for simultaneously applying stripes of liquid material to the so supported sheets, first to one pair of opposite spaced edegs of each sheet and then to another pair of opposite spaced edges of each sheet.

14. An apparatus as recited in claim 13, further including means so constructed and arranged to bring the striped sheets together in superposed relation for further transportation with a surface of the top sheet and a surface of the bottom sheet in touching relationship.

15. An apparatus for applying stripes of a liquid material to two sheets of glass which are to be placed in superposed, spaced relation and electrically welded to form a multiple glazed unit which comprises, means for engaging one major surface of the top sheet of glass and supporting and positioning it for striping without touching the other major surface of the top sheet, means for engaging one major surface of the bottom sheet of glass and supporting and positioning it in substantial horizontal aligned spaced relation to said top sheet for striping without touching the other major surface of the bottom sheet, and means for simultaneously applying stripes of liquid material to the so supported sheets, first to one pair of opposite spaced edges of each sheet and then to another pair of opposite spaced edges of each sheet.

16. An apparatus for applying stripes of a liquid material to two sheets of glass which are to be placed in superposed, spaced relation and electrically welded to form a multiple glazed unit which comprises means for engaging one major surface of the top sheet of glass and supporting and positioning it for striping without touching the other major surface of the top sheet, means for engaging one major surface of the bottom sheet of glass and supporting and positioning it in substantial vertical aligned spaced relation to said top sheet for striping without touching the other major surface of the bottom sheet, and means for simultaneously applying stripes of liquid material to the so supported sheets, first to one pair of opposite spaced edges of each sheet and then to another pair of opposite spaced edges of each sheet.

17. An apparatus for applying stripes of a liquid material to two sheets of glass which are to be placed in superposed, spaced relation and electrically welded to form a multiple glazed unit which comprises means for engaging the top surface of the top sheet of glass and supporting and positioning it for striping without touching the bottom surface of the top sheet, means for engaging the bottom surface of the bottom sheet of glass and supporting and positioning it in substantial vertical aligned spaced relation to said top sheet for striping without touching the top surface of the bottom sheet, and means for simultaneously applying stripes of liquid material to the so supported sheets, first to one pair of opposite spaced edges of each sheet and then to another pair of opposite spaced edges of each sheet.

18. An apparatus for applying stripes of a liquid material to two sheets of glass which are to be placed in superposed, spaced relation and electrically welded to form a multiple glazed unit which comprises a vacuum head formed of aluminum for engaging one major surface of the top sheet of glass and supporting and positioning it for striping without touching the other major surface of the top sheet, a vacuum head formed of aluminum for engaging one major surface of the bottom sheet of glass and supporting and positioning it in substantial aligned spaced relation to said top sheet for striping without touching the other major surface of the bottom sheet, and means for applying a stripe of liquid material around the edges of the sheets of glass while so supported.

19. An apparatus for applying stripes of a liquid material to two sheets of glass which are to be placed in superposed, spaced relation and electrically welded to form a multiple glazed unit which comprises means for engaging one major surface of the top sheet of glass and supporting it without touching the other major surface of the top sheet, means for engaging one major surface of the bottom sheet of glass and supporting it in substantial aligned spaced relation to said top sheet without touching the other major surface of the bottom sheet, means to fixedly position said engaging and supporting means and thereby position said sheets of glass for striping one pair of opposite spaced edges of each sheet, means to rotate said engaging and supporting means through an angle of substantially 90 degrees, means to fixedly position said engaging and supporting means after rotation and thereby position said sheets of glass for striping another pair of opposite spaced edges of each sheet, and means for applying said stripes to the edges of said sheets of glass while so positioned.

20. An apparatus for applying stripes of a liquid material to two sheets of glass which are to be placed in superposed, spaced relation and electrically welded to form a multiple glazed unit which comprises means for engaging one major surface of the top sheet of glass and supporting it without touching the other major surface of the top sheet, means for engaging one major surface of the bottom sheet of glass and supporting it in substantial aligned spaced relation to said top sheet without touching the other major surface of the bottom sheet, means to fixedly position said engaging and supporting means and thereby position said sheets of glass for striping one pair of opposite spaced edges of each sheet, means to rotate said engaging and supporting means through an angle of substantially 90 degrees, means to fixedly position said engaging and supporting means after rotation and thereby position said sheets of glass for striping another pair of opposite spaced edges of each sheet, means for applying said stripes to the edges of said sheets of glass while so positioned, and means so constructed and arranged to bring the striped sheets together in superposed relation for further transportation with a surface of the top sheet and a surface of the bottom sheet in touching relationship.

21. An apparatus for applying stripes of a liquid material to two sheets of glass which are to be placed in superposed, spaced relation and electrically welded to form a multiple glazed unit which comprises means for engaging one major surface of the top sheet of glass and supporting it without touching the other major surface of the top sheet, means for engaging one major surface of the bottom sheet of glass and supporting it in substantial horizontal aligned spaced relation to said top sheet without touching the other major surface of the bottom sheet, means to fixedly position said engaging and supporting means and thereby position said sheets of glass for striping one pair of opposite spaced edges of each sheet, means to rotate said engaging and supporting means through an angle of substantially 90 degrees, means to fixedly position said engaging and supporting means after rotation and thereby position said sheets of glass for striping another pair of opposite spaced edges of each sheet, and means for applying said stripes to the edges of said sheets of glass while so positioned.

22. An apparatus for applying stripes of a liquid material to two sheets of glass which are to be placed in superposed, spaced relation and electrically welded to form a multiple glazed unit which comprises means for engaging one major surface of the top sheet of glass and supporting it without touching the other major surface of the top sheet, means for engaging one major surface of the bottom sheet of glass and supporting it in substantial vertical aligned spaced relation to said top sheet without touching the other major surface of the bottom sheet, means to fixedly position said engaging and supporting means and thereby position said sheets of glass for striping one pair of opposite spaced edges of each sheet, means to rotate said engaging and supporting means through an angle of substantially 90 degrees, means to fixedly position said engaging and supporting means after rotation and thereby position said sheets of glass for striping another pair of opposite spaced edges of each sheet, and means for applying said stripes to the edges of said sheets of glass while so positioned.

23. A method of applying stripes of a liquid material to two sheets of glass which are to be electrically welded to form a double glazed unit which comprises positioning the glass sheets in a horizontal plane located below a number of striping applicators and in vertical alignment with a supporting means located above the sheets and a supporting means located below the sheets, engaging the top surface of one sheet from above with the supporting means located above the sheet and raising the supporting means and sheet vertically, engaging the bottom surface of the other sheet with the supporting means located below the sheet and raising them vertically, passing the striping applicators across the surfaces of the sheets and in contact therewith so as to apply stripes along the edges of the sheets and lowering the first said sheet onto the second sheet in touching relationship for further transportation.

24. An apparatus for applying a stripe of a liquid material to a sheet of glass comprising a conveyor, centering and positioning means on the conveyor, a structural framework above the centering and positioning means, a vacuum head supported on the framework and positioned above the conveyor in vertical alignment with the centering and positioning means, another vacuum head mounted below the centering and positioning means in vertical alignment therewith, means for raising and lowering the respective vacuum heads, a carriage movable on the framework, a striping applicator mounted on the carriage, means for driving the carriage back and forth on the framework and means for indexing the vacuum head.

25. An apparatus such as described in claim 24 wherein the vacuum heads are in vertical alignment with each other.

26. An apparatus such as described in claim 24 wherein the vacuum head supported on the framework contains finger means extendable below the level of the vacuum head so as to support a sheet of glass in a horizontal position therebelow.

References Cited in the file of this patent

UNITED STATES PATENTS

| | | |
|---|---|---|
| 2,104,422 | Heichert | Jan. 4, 1938 |
| 2,117,840 | Crew | May 17, 1938 |
| 2,225,778 | Hallman | Dec. 24, 1940 |
| 2,356,136 | Wampler | Aug. 22, 1944 |
| 2,360,918 | Wade | Oct. 24, 1944 |
| 2,389,360 | Guyer | Nov. 20, 1945 |
| 2,394,051 | Guyer | Feb. 5, 1946 |
| 2,398,525 | Gray | Apr. 16, 1946 |
| 2,566,151 | Wright | Aug. 28, 1951 |
| 2,597,106 | Kallenborn | May 20, 1952 |
| 2,624,978 | Hohman | Jan. 13, 1953 |
| 2,624,979 | Clever | Jan. 13, 1953 |
| 2,632,918 | Bergstein | Mar. 31, 1953 |